Nov. 15, 1938.   G. B. JENSEN   2,136,510
AUTOMOBILE SEAT INFLATION DEVICE
Filed Sept. 23, 1936
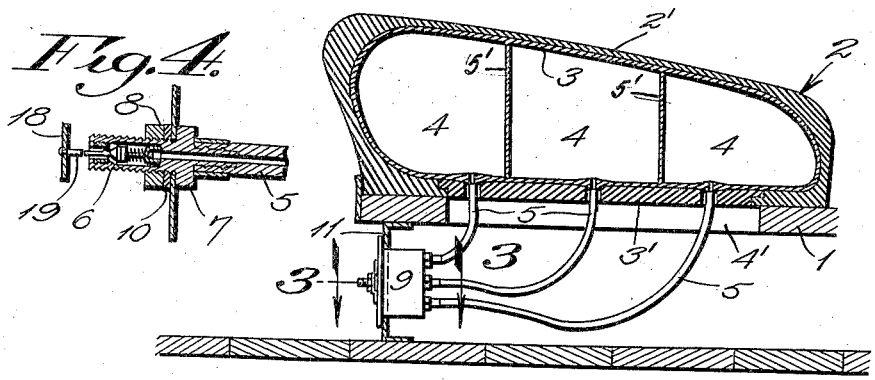
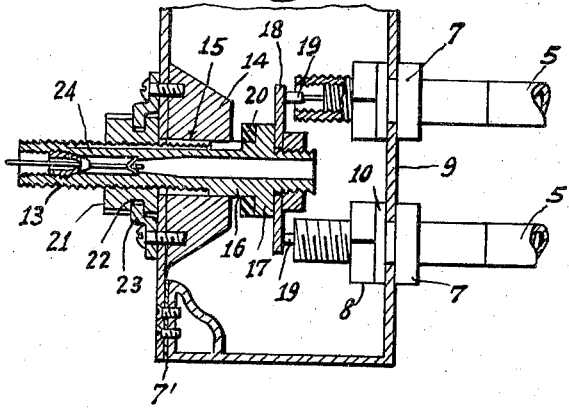
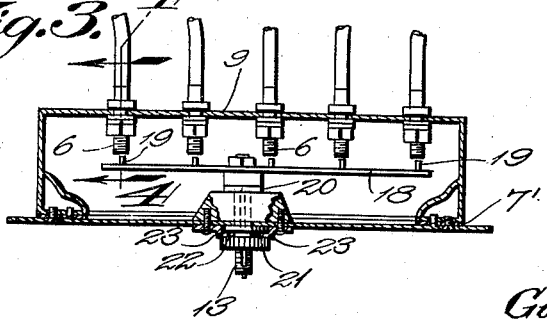
Gustav B. Jensen
INVENTOR
BY Victor J. Evans & Co.
ATTORNEYS
WITNESS Patented Nov. 15, 1938

2,136,510

UNITED STATES PATENT OFFICE 2,136,510

AUTOMOBILE SEAT INFLATION DEVICE

Gustav B. Jensen, West Palm Beach, Fla.

Application September 23, 1936, Serial No. 102,209

2 Claims. (Cl. 277—26)

This invention relates generally to pneumatic seat cushions, back rests and the like, and an important object is to provide a pneumatic seat cushion for a motor vehicle and a valve device for inflating and deflating the same.

A further object is to provide a deflating device to which can be applied an air hose of the usual construction for inflating a pneumatic seat cushion, and the device is readily operable for releasing the air therefrom, so that the air pressure within the cushion can be varied in accordance with the user's desires.

Another object is to provide a pneumatic seat cushion or the like, that is divided into a plurality of independent cells or compartments, each being inflatable and deflatable, so that the seat can be retained in a shape to effect utmost comfort to a person when in use.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary vertical sectional view illustrating a motor vehicle seat cushion provided with air cells and shows the valve device with means of communication between the same and the cells, in elevation.

Figure 2 is a fragmentary vertical sectional view taken through my valve device.

Figure 3 is a detail sectional view taken on the line 3—3 of Figure 1.

Figure 4 is a detail sectional view taken on the line 4—4 of Figure 3.

Figure 5 is a perspective view showing the parts of the main inflating valve of this invention.

Referring in detail to the drawing, the numeral 1 indicates a fragmentary portion of a seat frame of a motor vehicle on which is located a pneumatic seat 2 consisting of a covering 2' in which is located an inflatable inner tube or body 3. A portion of the covering 2' is removable, as indicated at 3', to permit the inner tube or body to be readily placed in the covering 2'. Also the frame 1 has an opening 4' directly under the removable portion 3' of the covering. The inner tube or body 3 is divided into a plurality of cells 4 by integrally connected transversely and longitudinally extending partitions 5', said partitions also being integrally connected with the walls of the inner tube or body. Connected to the cells are inflating tubes 5. Said tubes extend through openings in the removable portion 3' of the covering and also through the opening 4' of the seat frame. Said tubes have connected thereto self-closing valves 6 equipped with collars 7 and clamping nuts 8. The self-closing valves 6 are similarly constructed to the valves employed in inner tubes of pneumatic tires and are mounted in openings formed in one wall of an air tight casing 9. The valves 6 are clamped to said walls of the casing by the collars 7 and nuts 8, suitable gaskets 10 being interposed between the wall of the casing and the nuts to establish air tight connection between the valves and the casing. The casing may be of any suitable size and is carried by a support 11 and located adjacent the seat frame where it will be readily accessible. The front wall of the casing is detachable and is provided with a gasket 7' to establish an effective seal between said casing and the front wall thereof when the latter is applied to the casing. The front wall has an opening to receive a main inflating valve 13 of a self-closing type. Secured to the front wall within the casing is a block 14 having a square opening 15 to fit the squared portion 16 of the valve 13. A flange 17 is formed on the valve 13 and forms a seat for a plate 18 secured to the valve and arranged in the casing for carrying projections 19 to engage the valves 6 for opening or unseating said valves. A gasket 20 is positioned on the valve 13 between the flange 17 and the block 14 so that when the flange 17 is drawn tightly against said block an air tight fit will be provided between the valve and the block. A nut 21 is threaded on the valve 13 for drawing the flange 17 and gasket 20 tightly against the block 14. The nut 21 is grooved, as shown at 22, to be engaged by clips 23 secured to the front wall of the casing. The clips permit the nut 21 to rotate freely, however, the nut is held by the clips against endwise movement on the valve so that when the nut is rotated the valve is caused to move endwise to engage and disengage the projections with the valves 6. The external face of the valve 13 has a groove 24 which is closed to the interior of the casing when the flange 17 is drawn against the block 14. However, when the valve 13 is moved endwise for the purpose of engaging the projections 19 with the valves 6 for opening the latter, the groove 24 comes into communication with the interior of the casing for the purpose of bleeding the latter.

Normally the flange 17 of the valve is drawn tightly against the block 14 and to inflate the cells 4 simultaneously an air supply medium is applied to the valve 13 similar to the inflation of a pneumatic tire. When it is desired to deflate or lower the air pressure in the cells, the nut 21 is adjusted to move the valve 13 endwise and thereby bring about unseating of the valves 6 and the opening of the groove 24.

Having described the invention, I claim:

1. An inflating device comprising an air tight casing, a plurality of self-closing valves secured to and in communication with the interior of said casing and adapted for connection with tubes from compartments to be inflated, a block secured to the casing and having a rectangular shaped opening, a main inflation valve having a rectangular shaped body portion fitting in the opening of the block for reciprocation therein and extending exteriorly of the casing, a gasketed flange on the body of the main valve to abut the block and establish an air tight connection between the main valve body and the block, a nut threaded to the main valve body and journaled to the casing for the purpose of imparting endwise movement to the main valve body for engaging and disengaging the flange with the block, said main valve body having a bleed groove providing communication between the interior of the casing and the atmosphere, and closed by the flange abutting the block and means carried by the main valve body for unseating the first named valves upon reciprocation of said main valve body.

2. An inflating device comprising an air tight casing, a plurality of self-closing valves secured to and in communication with the interior of said casing and adapted for connection with tubes from compartments to be inflated, a block secured to the casing and having a rectangular shaped opening, a main inflation valve having a rectangular shaped body portion fitting in the opening of the block for reciprocation therein and extending exteriorly of the casing, a gasketed flange on the body of the main valve to abut the block and establish an air tight connection between the main valve body and the block, a nut threaded to the main valve body and journaled to the casing for the purpose of imparting endwise movement to the main valve body for engaging and disengaging the flange with the block, said main valve body having a bleed groove providing communication between the interior of the casing and the atmosphere, and closed by the flange abutting the block, a plate secured to the main valve body, and projections formed on said plate to engage the first named valves for unseating the latter by endwise movement of the main valve body for the purpose of bleeding the compartments of air.

GUSTAV B. JENSEN.